July 16, 1940.   J. J. P. VIGROUX   2,208,204

CLOSED BODY, IN PARTICULAR FOR AUTOMOBILE VEHICLES

Filed Dec. 10, 1936

INVENTOR.
Joseph Jean Pierre Vigroux.

BY

ATTORNEY.

Patented July 16, 1940

2,208,204

UNITED STATES PATENT OFFICE 2,208,204

CLOSED BODY, IN PARTICULAR FOR AUTOMOBILE VEHICLES

Joseph Jean Pierre Vigroux, Ivry-sur-Seine, France

Application December 10, 1936, Serial No. 115,081
In France December 28, 1935

8 Claims. (Cl. 296—84)

The invention relates to closed bodies, and concerns more particularly those for automotive vehicles.

It has mainly for its object to improve the visibility and the comfort of the driver and the passengers.

It consists principally:

In completely eliminating the posts usually located on either side of the wind-shield and in front of the side door windows;

In firmly supporting the roof from the rear of the body, as though said roof had to completely support itself in the overhanging position by means of the sole strength of its rear portion;

To close the body in the front, by means of a rugged wind-shield glass which is not provided with any frame;

To provide, in the wind-shield glass, holes for receiving therethrough fixing bolts, provided with resilient fittings;

To thereby establish the connection of the roof with the dash-board by means of said rugged wind-shield glass;

To provide, on the lower part and on the sides of the wind-shield glass, a moulded channel-shaped beading, to prevent the entry of water under the influence of rain and wind;

To leave the front edge of the glass panels of the side windows free of any frame; and To arrange the door windows' glass-panels so that they bear with their front edge against the rear face of the wind-shield glass and with their rear edge against the front edge of the side window glass panels, with or without the interposition of a resilient fitting.

It consists, apart from these principal arrangements, which are preferably used at the same time, but can be used independently, of certain other arrangements which will be more explicitly mentioned hereinafter. It will, in any case, be readily understood with the aid of the following description, together with the accompanying drawing which is of course given mainly by way of example.

Figure 1:
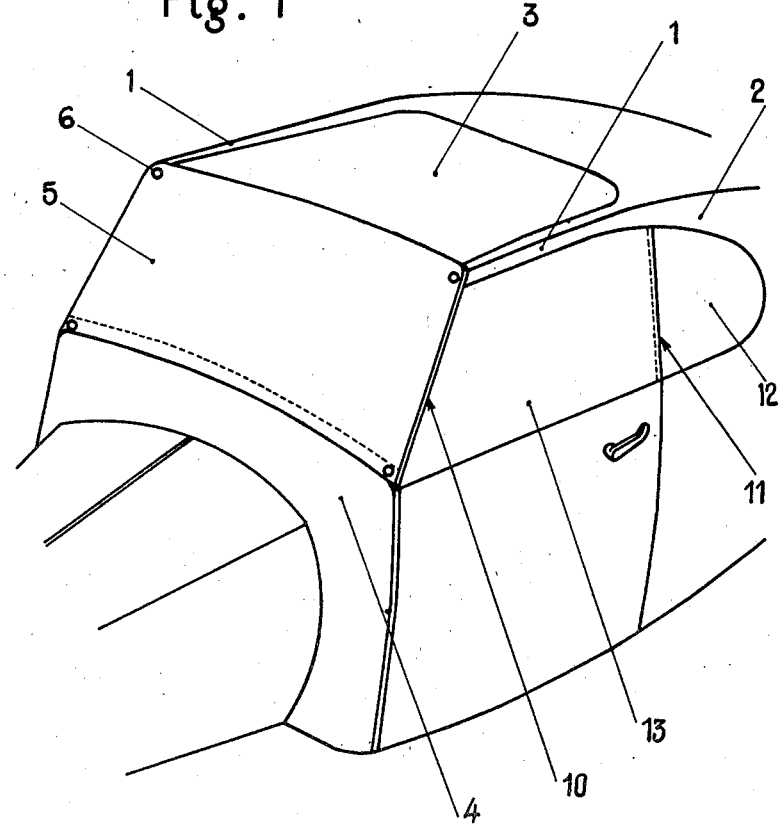
Figure 1 shows, in diagrammatic perspective, the assembly of the essential parts of a body, constructed in accordance with the invention.

According to the invention, the roof comprises two side sills 1 (Fig. 1) which are supported at the rear by a rugged arm 2 which is formed for example by two side sheets of metal and the rear panel, suitably reinforced so that the two sills 1 can, if necessary, support themselves in the overhanging position together with the sky panel 3 of the roof, which can be slidable.

Figure 2:
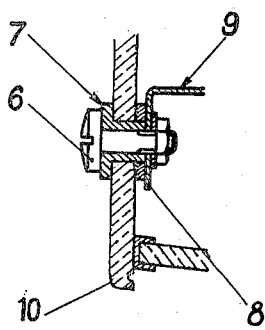
Figures 2 and 3 show, in diagrammatic section, details of construction of the same body.

The body is closed in the front by a wind-shield or glass panel 5, known as "safety glass," preferably thicker than usual, for example 10 to 16 mm. thick, to ensure its ruggedness, and in which fixing holes are provided. Said glass panel 5 is fixed by means of bolts such as 6, which are passed through the fixing holes, and are provided with resilient fittings formed for example by a tube 7 (Fig. 2) made of rubber and a washer 8 to enable the bolt 6 to be suitably clamped on iron brackets such as 9 of the sills 1 of the roof and of the dash-board 4 of the body. The roof will therefore be rigidly connected to the dash-board through the instrumentality of the glass 5.

It will be advantageous to terminate the lower part of the wind-shield glass 5, and if necessary its side portions, by a channel-shaped beading formed in the actual material of the glass either by moulding or by any other method, preferably before the treatment which is intended to give the glass its so-called "safety" properties.

The side window glass panels 12 are arranged so that they are held at their lower, rear and upper parts, in the usual manner, the front edge 11 of said windows being kept free from any frame.

The door window glass-panels 13 are constructed so that they can bear with their front edge against the rear side or face 10 of the wind-shield glass 5, which is allowed to project slightly for this purpose, and with their rear edge on the front edge 11 of the side windows 12.

Figure 3:
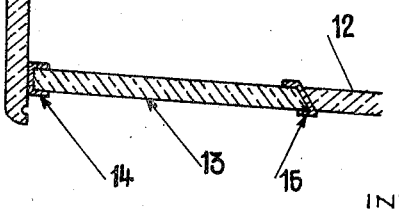

In order to prevent the vibrations of the vehicle causing breakage of the glass by the impact of their edges, said edges can be provided with resilient fittings, such as 14 and 15 (Fig. 3) which will serve at the same time to prevent seepage of water. In this connection, it will be advantageous to provide between the two glass panels 12 and 13, a bevel joint such as shown in Figure 3.

As a result of the foregoing, a closed body for an automotive vehicle is obtained in which posts are entirely eliminated, thereby preventing impairment of the driver's visibility necessary for driving and giving to the passengers the pleasure of having the full view of the landscape.

As it is obvious, and as moreover it already appears from the foregoing, the invention is in no way limited in its modes of application, nor to the particular construction of its various parts, which have been more particularly described; it includes, on the contrary, all modifications, in particular: that in which the said improvements are used otherwise than for land vehicles, for example, for sheltering the bridge of a yacht, or the cock-pit of a motor boat or of an aircraft.

From the foregoing it can readily be seen that there has been herein provided a body for automotive vehicles, comprising a frameless windshield, a set of side doors, a set of laterally secured panels, a set of side door windows, and a roof, said roof including a set of extensions substantially overhanging said doors, each of said extensions having a free end, said extensions and said roof being adapted for slidably receiving a roof panel, said roof panel having a free edge, each of said extensions and a respective side door providing a space therebetween, said side door windows being disposed respectively within said spaces and being contiguous to the front edge of each of said transparent side panels, said side door windows substantially abutting against the rear face of and said roof panel engaging with said wind-shield, and resilient fittings between said wind-shield and each of said side door windows and between the latter and its respective contiguous transparent panel, said wind-shield being resiliently secured substantially to the free ends of said extensions.

Having thus described the invention what is claimed as new and desired to be secured by Letters Patent, is:

I claim:

1. In a closed body for automotive vehicles having a dash board and a roof; a frameless windshield, side door windows, and a roof panel, said windshield being resiliently secured substantially at its corners to said dash board and said roof respectively, said panel being embraced by said roof adjacent three sides thereof and having a free edge, said edge of said panel and said windows being adapted for abutment with said windshield.

2. In a closed body for automotive vehicles having a dash board; a roof, said roof having extending portions provided with free ends, said portions providing opposite projecting sides, a frameless windshield, side door windows, and a slidable roof panel, said panel being embraced by said roof adjacent said opposite sides and having a free edge, said edge of said panel and said windows being adapted for abutment with said windshield, said windshield being resiliently secured substantially at its corners to said dash board and said free ends of said roof portions, respectively.

3. A closed body for automotive vehicles, comprising a frameless windshield, side door windows, a slidable transparent roof panel having a free dge, and means for resiliently securing said windshield to the front of said body, said means extending through said windshield at its corners, said windows being adapted to abut against the rear face of and the free edge of said panel being adapted to engage with said windshield.

4. A closed body for automotive vehicles, comprising a frameless windshield, side door windows having each a lateral bevelled edge, and a slidable roof panel having a free edge, said windshield being resiliently secured at its corners to the front of said body, said edge of said side windows having resilient means for engaging the rear face of said windshield.

5. A body for automotive vehicles, comprising a frameless windshield, a set of side doors, a set of laterally secured panels, a set of side door windows, and a roof, said roof including a set of extensions substantially overhanging said doors, each of said extensions having a free end, said extensions and said roof being adapted for slidably receiving a roof panel, said roof panel having a free edge, each of said extensions and a respective side door providing a space therebetween, said side door windows being disposed respectively within said spaces and being contiguous to the front edge of each of said transparent side panels, said side door windows substantially abutting against the rear face of and said roof panel engaging with said windshield, and resilient fittings between said windshield and each of said side door windows and between the latter and its respective contiguous transparent panel, said windshield being resiliently secured substantially to the free ends of said extensions.

6. A body for automotive vehicles, comprising a frameless windshield, a set of side doors, a set of side windows therein, and a roof, said roof including a set of extensions substantially overhanging said doors, each of said extensions presenting a free end, a space provided between said extensions, a plate slidably disposed within said space, said side windows and said plate being adapted to engage with said windshield, and means for resiliently securing said windshield substantially to the free ends of said extensions.

7. In a closed body for automotive vehicles having a roof with a cut-out portion provided with forwardly directed projections and with a dash; a frameless windshield having an upper edge and a lower edge, said windshield being provided with apertures substantially at the corners thereof, and uniting means having a resilient lining passing through said apertures, said means being secured to the free forward ends of said projections of said roof and to said dash for resiliently maintaining said windshield in position at its upper edge and its lower edge.

8. In a closed body for automotive vehicles comprising a frameless windshield, side windows, a slidable roof panel, and uniting means having a resilient lining, said uniting means passing through apertures in said windshield and being applied at its corners to the front of said body to resiliently secure said windshield thereat, said windows and said panel being adapted to slidingly engage with said windshield.

JOSEPH JEAN PIERRE VIGROUX.